United States Patent Office 3,071,815
Patented Jan. 8, 1963

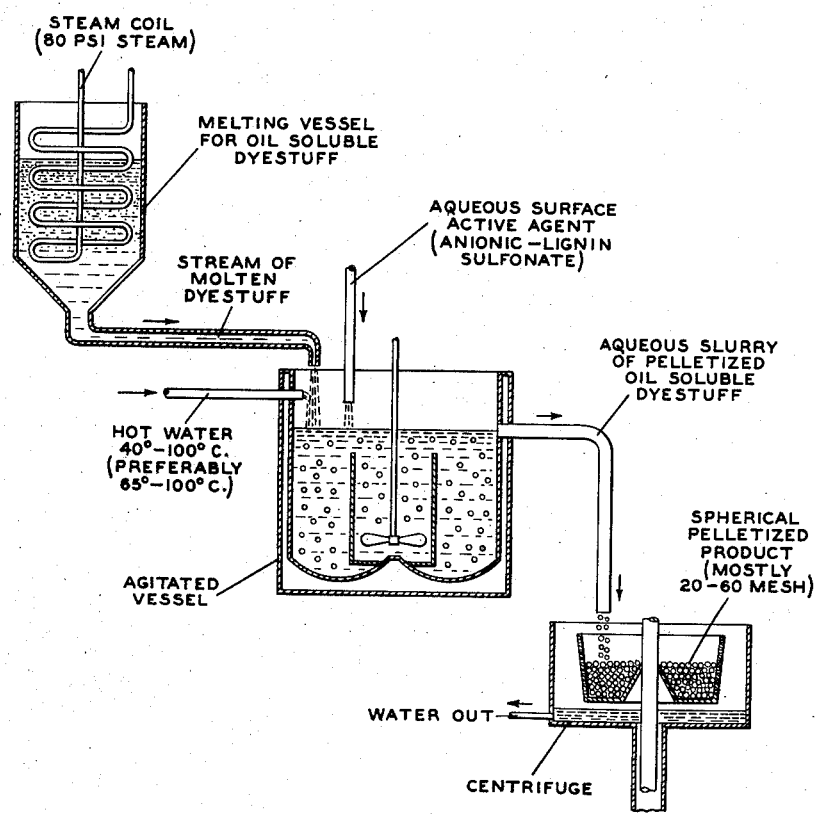

3,071,815
PROCESS FOR PRODUCING FREE FLOWING OIL SOLUBLE FUSIBLE ORGANIC DYESTUFFS
Bernard R. MacKinnon, Buffalo, N.Y., assignor to Allied Chemical Corporation, New York, N.Y., a corporation of New York
Filed Sept. 9, 1958, Ser. No. 759,843
7 Claims. (Cl. 18—47.2)

This invention relates to a process for producing a free flowing oil soluble fusible organic dyestuff.

Many oil soluble organic dyestuffs which are widely used in the coloring of such diverse materials as plastics, foods, petroleum products and waxes have been available to the trade in the form of powder. These powders unfortunately have many inherent objectionable characteristics. They sometimes lump-up and pack in containers, thus making the powder inconvenient to handle, particularly during weighing or transferring operations. Furthermore, they also have a tendency to dust. When this happens, it is it is difficult to use the powdered dyestuff without having minute particles of the dye get into the atmosphere from which the dye may later be deposited upon surrounding objects or even in the lungs and on exposed skin areas of people working in the vicinity. Since the industry is an old one and since the problem is readily apparent and objectionable from both a housekeeping and a health viewponit, a great deal of time and effort has been directed toward solving this particular problem. In recent years a partial solution has been provided in the form of "non-dusting addition agents." However, these are not only fugitive in character but also add to the dye composition an adulterant or diluent which in many instances is objectionable.

It is accordingly an object of this invention to provide a process for the treatment of solid fusible organic dyestuffs which will make them free flowing and dustless.

Another object of this invention is to achieve the above object without resorting to the use of adulterants or diluents.

A still further object of this invention is to provide an economic process for improving the handling characteristics of oil soluble fusible organic dyestuffs.

The drawing is a flow diagram of the process.

It has been found that these objects and other advantages incidental thereto can be achieved by commingling a molten stream of an oil soluble dyestuff with a vigorously agitated body of a congealing liquid which is non-solvent for the dye with the temperature of the non-solvent substantially below that of the solidifying point of the dyestuff. Under these conditions it has been found that the major proportion of the dyestuff is obtained in the form of particulate pellets, the major proportion of which are smaller than 20 mesh but larger than 60 mesh. In this form the dyestuff is characterized by being substantially dustless, readily soluble in lower petroleum solvents, more free flowing, more dense and more easily transferable by vacuum means than the same dyestuff in untreated form. This treatment is preferably carried out in the presence of a surface active agent.

The congealing medium which is most often used is water. However, it can be any non-reactive liquid in which the dyestuff is substantially insoluble and which functions to remove heat from the molten dyestuff rapidly. Preferably the liquid is one which can be readily separated from the congealed particulate dyestuff. Other examples of such media include inorganic salt solutions as for example, brine, aqueous sodium sulfate and the like.

In order to achieve consistently satisfactory results an excess of the liquid congealing medium should be used, preferably at least about 20 parts by weight per part of molten dyestuff. As is readily apparent this ratio is of course capable of wide variations since the liquid functions primarily as a heat transfer medium and its efficiency will vary with the particular dyestuff, the particular congealing liquid, the temperature of the melt, the rate at which the melt is added, the temperature of the liquid medium, etc. It is well within the skill of those trained in this art to adjust these common variables to obtain suitable conditions for carrying out this process particularly in view of the disclosures made in this specification.

The temperature of the congealing medium can be varied over a wide range. It has however been found preferable to make use of temperatures between about 65 and 95° C. Temperatures below about 40° C. may result in too rapid cooling of the dye being treated and consequently the formation of a too large average particle size, whereas temperatures above about 100° C. are generally not necessary and are wasteful of power. The optimum temperature will vary with the particular dyestuff being pelletized and it should be within the skill of the trained chemist to determine the optimum temperature conditions for a specific dyestuff by means of several simple test runs. When water is used as the medium, excessively high temperatures result in boiling as the heat transfer progresses and can cause loss through spillage of the dyestuff.

The pelletizing of the molten dyestuff is preferably carried out in the presence of a surface active agent. Only small amounts, of the order of 0.1% based on the weight of the liquid, are required. The pellets obtained in the absence of the surface active agent appear to be less smooth and duller than those obtained in the presence of said agent. In all instances, however, the dyestuff is obtained in a free flowing, particulate, dustless form. The surface active agents which can be used, in addition to the "Marasperse N" (a lignin sulphonate) illustrated in the examples, are the anionic type surface active agents of which the following are typical:
Sodium salt of formaldehyde-naphthalene sulfonic acid condensation products, e.g. "Tamol N," "Naccotan"
Fatty alcohol sodium sulfonate, e.g. "Duponol 1"
Esters of sodium isethionate, e.g. "Igepon AC–78"
Sodium salt of sulfate ester of an alkylphenoxy-polyoxyethylene ethanol such as "Alipal CO–433."

The products are obtained usually in the form of shiny spherical pellets and are thus distinguished from the irregularly shaped particles obtained by one of the prior art processes involving a grinding operation. It is believed that the pellet shape contributes to the free flowing character which together with the greater density and substantial freedom from dust distinguishes these products from those of prior art.

The following examples will illustrate the present invention. Parts are by weight and temperatures are given in degrees centigrade.

EXAMPLE 1

Approximately 250 parts of Oil Orange (CI 24) was heated to a maximum of 150° and the resultant melt was run in a thin stream into a stream of hot (70°) water flowing at the rate of about 8 liters per minute into a vessel equipped with an agitator revolving at the rate of 900 r.p.m. Simultaneously with the flow of water 10% aqueous solution of "Marasperse N" (a lignin sulfonate product of Marathon Company, Chemical Division, Rothschild, Wisc.) was added to the mixture at a rate such as to obtain a 0.1% concentration of the dispersing agent in the aqueous mixture. The suspension was filtered and the pelletized dyestuff dried at 100°.

The dried product was obtained in the form of shiny spherical pellets of a size such that only 2% was retained on a 20 mesh screen, 26% was retained on a 40 mesh screen and 72% passed through the 40 mesh screen.

This experiment was repeated omitting only the "Marasperse N." The resultant product was obtained in substantially the same free flowing particulate form. These pellets differed from those obtained in the presence of the surface active agent essentially in that they had a rough rather than smooth exterior and were not so free flowing.

EXAMPLE 2

About 3625 parts of Oil Orange (CI 24) was melted using 80 p.s.i. steam and then run through a lagged 1 inch line into hot (70°) water containing sufficient "Marasperse N" to give a 0.1% concentration. The water was agitated at the rate of 1425 r.p.m. and flowed at the rate of 10,000 parts per hour. The addition of the molten color was varied from several fine streams (about ⅛ inch) to a single large stream (about 1 inch). Thereafter the color slurry was centrifuged, spun "dry" and dried at 100° for 48 hours. The amount of dry color recovered in this manner was 3605 parts of which—

636 parts was retained on a 20 mesh screen
148 parts passed through 60 mesh screen.

In an analogous fashion Oil Red EGN, CI Prototype 696, was converted into smooth pellets which were free flowing and dustless. In this instance the molten dyestuff was added to the water, which was heated to between 90° and 95°.

EXAMPLE 3

(A) Oil Orange (CI 24) was melted and then run into an enamel pan where it solidified. The dyestuff was ground and screened through a 20-mesh screen.
(B) A second portion of Oil Orange (CI 24) was prepared as described in Example 1 and the color screened to eliminate beads larger than 20 mesh and finer than 60 mesh.

The two products obtained above were compared for physical characteristics with the following results:

*Table I*

| Test | Product A | Product B |
| --- | --- | --- |
| Rate of solution [1] | 98.1% soluble after 15 minutes. | 97.2% soluble after 15 minutes. |
| Scott number,[2] gm./cu. in. | 5.5 | 10.6. |
| Apparent specific gravity, gm./cc. | 0.42 | 0.67. |
| Setting up test [3] | Appreciable amount of lumping between 65-100°. | No lumping or packing. |
| Non-dusting properties [4] | Slight dusting | Slightly superior. No dust. |
| Transfer of material from container with a suction tube.[5] | Poor | Very good. |

[1] The dyestuff was added to slowly agitated (175 r.p.m.) gasoline using an amount of dye to give a concentration ten times that of expected use. At 15 minute intervals, about 10 ml. of the dye solution were removed and filtered. Then 5 ml. of the solution were transferred to a 50 ml. volumetric flask and were diluted with the solvent used to 50 ml. The color strength was determined in a Duboscq Colorimeter. After the color strength had become constant, the solution was agitated rapidly (about 1800 r.p.m.) for ten minutes and filtered. The insolubles were dissolved in 100 ml. of Stoddard solvent and the color strength of the resultant solution was determined colorimetrically. The results given are from two such tests.
[2] The apparent density of the dyestuff was measured with the use of a Scott volumeter as described in Stewart's Scientific Dictionary, page 614 (4th ed., published by Stewart Research Laboratory, Alexandria, Va.).
[3] The dyestuff was loosely packed to a level of about 3 inches in a test tube and the tube immersed in a constant temperature bath for one hour. The tube was agitated occasionally. Thereafter the tube was permitted to stand at ambient temperature for one hour. The tube was inverted, and the physical condition of the sample observed. The test was carried out at 65° and repeated at 75°, 85° and 100°.
[4] The dyestuff was dropped down a 100 cc. measuring cylinder and the amount of dust produced determined by observation.
[5] Suction developed with the use of a dry dye eductor.

From these data it can be seen that product B is more free flowing, readily soluble in gasoline, contains less dust, is more dense, shows less tendency to set up and pack, and is more readily transferred from a container with the use of suction than product A.

From the above purely illustrative examples, it can be seen that novel means has been provided to prepare oil soluble fusible organic dyestuffs in a dense free flowing non-dusting form. As will be readily apparent to those skilled in this art many variations can be made in the details of the several examples without departing from the broad scope of this invention.

For example, the organic dyestuffs to which this process is applicable include those of the azo and anthraquinone classes. Suitable dyestuffs are those which can be heated to and maintained at or slightly above their melting point without significant decomposition. Typical dyestuffs which can be treated in the manner of this invention include:

|  | C. I. # | New C. I. # |
| --- | --- | --- |
| Oil Red EGN | Pr. 696 | Solv. Red 26. |
| Oil Red O | Pr. 658 | Solv. Red 27. |
| Oil Yellow 2681 | CI 17 | Solv. Yellow 3. |
| Oil Yellow 2625 | CI 19 | Solv. Yellow 2. |
| Oil Orange 2311 | CI 24 | Solv. Yellow 14. |
| Brilliant Oil Blue BMA | CI | Solv. Blue 16. |
| Oil Blue A | None | Solv. Blue 36. |

Although certain preferred embodiments of the invention have been disclosed for purpose of illustration, it will be evident that various changes and modifications may be made therein without departing from the scope and spirit of the invention.

I claim:

1. The process for producing an oil soluble fusible organic dyestuff in free flowing particulate form comprising commingling a molten stream of an oil soluble dyestuff with a vigorously agitated body of a non-reactive liquid in which the dyestuff is substantially insoluble with the temperature of the non-reactive liquid substantially below that of the solidifying point of the dyestuff and separating the resulting spherical pellets of dyestuff from the non-reactive liquid.

2. The process for producing an oil soluble fusible organic dyestuff in free flowing particulate form comprising adding an oil soluble fusible organic dyestuff in molten form to a vigorously agitated body of water which is maintained at a temperature between about 40° C. and 100° C. and separating the resulting spherical pellets of dyestuff formed thereby from the water.

3. The process of producing an oil soluble fusible organic dyestuff in free flowing particulate form comprising commingling a molten stream of an oil soluble dyestuff with a vigorously agitated body of a non-reactive liquid in which the dyestuff is substantially insoluble in the presence of a surface active agent with the temperature of the non-reactive liquid substantially below that of the solidifying point of the dyestuff and separating the resulting spherical pellets of dyestuff from the non-reactive liquid.

4. The process for producing an oil soluble fusible organic dyestuff in free flowing particulate form comprising commingling a molten stream of an oil soluble dyestuff with a vigorously agitated body of a non-reactive liquid in which the dyestuff is substantially insoluble with the temperature of the non-reactive liquid held between 65 and 95° C., and separating the resulting spherical pellets of dyestuff from the non-reactive liquid.

5. The process for producing an oil soluble fusible organic dyestuff in free flowing particulate form comprising adding an oil soluble fusible organic dyestuff in molten form to a vigorously agitated body of water which is maintained between 65 and 95° C. and separating the resulting spherical pellets of dyestuff formed thereby from the water.

6. The process of producing an oil soluble fusible organic dyestuff in free flowing particulate form comprising commingling a molten stream of an oil soluble dyestuff with a vigorously agitated body of a non-reactive liquid in which the dyestuff is substantially insoluble in the presence of a surface active agent with the temperature of the non-reactive liquid maintained between 65 and 95° C. and separating the resulting spherical pellets of dyestuff from the non-reactive liquid.

7. The process of producing an oil soluble fusible organic dyestuff in free flowing particulate form comprising commingling a molten stream of an oil soluble dyestuff with a vigorously agitated body of a non-reactive liquid in which the dyestuff is substantially insoluble in the presence of an anionic type surface active agent with the temperature of the non-reactive liquid maintained between 65 and 95° C., and separating the resulting spherical pellets of dyestuff from the non-reactive liquid.

References Cited in the file of this patent

UNITED STATES PATENTS

| | | |
|---|---|---|
| 1,782,038 | Haak | Nov. 18, 1930 |
| 2,007,386 | Stanley et al. | July 9, 1935 |
| 2,261,626 | Lang | Nov. 4, 1941 |
| 2,375,175 | Silk | May 1, 1945 |
| 2,491,160 | Bruce | Dec. 13, 1949 |
| 2,740,705 | O'Neill et al. | Apr. 3, 1956 |
| 2,754,294 | Hein et al. | July 10, 1956 |
| 2,796,415 | Ludwig et al. | June 18, 1957 |
| 2,896,261 | McAlfee | July 28, 1959 |
| 2,938,233 | Nack et al. | May 31, 1960 |

OTHER REFERENCES

Color Index Society of Dyers and Colorists, 1st ed., 1924, page 6 relied on.